US009914368B1

(12) United States Patent
Marcicki et al.

(10) Patent No.: US 9,914,368 B1
(45) Date of Patent: Mar. 13, 2018

(54) THERMAL MANAGEMENT SYSTEM FOR A HYBRID VEHICLE

(71) Applicant: FORD GLOBAL TECHNOLOGIES, LLC, Dearborn, MI (US)

(72) Inventors: James Matthew Marcicki, Livonia, MI (US); Alvaro Masias, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/421,686

(22) Filed: Feb. 1, 2017

(51) Int. Cl.
  *G05D 23/00* (2006.01)
  *B60L 11/18* (2006.01)
  *H02P 4/00* (2006.01)

(52) U.S. Cl.
  CPC ....... *B60L 11/1874* (2013.01); *B60L 11/1803* (2013.01); *B60L 11/1861* (2013.01); *B60L 11/1864* (2013.01); *H02P 4/00* (2013.01); *B60L 2210/10* (2013.01)

(58) Field of Classification Search
  CPC ........ G05D 23/00; G05D 23/02; G05D 23/20; G05D 23/32; G05B 5/00; G05B 5/01; H02P 1/00; H02P 3/00; H02P 5/00; H02P 6/00; H02P 23/00; H02P 25/00; H02P 27/04; H02P 27/06; H02P 27/00; H02P 21/00; H02J 7/00; H02J 7/04
  USPC ......... 318/139, 400.01, 400.02, 400.14, 700, 318/701, 726, 727, 471, 472, 473; 388/800, 909, 934; 320/132, 137, 166, 320/167, 144
  See application file for complete search history.

(56) References Cited

U.S. PATENT DOCUMENTS

| 8,080,971 | B2 | 12/2011 | Bose et al. | |
| 8,138,720 | B2 * | 3/2012 | Snyder | B60K 6/448 |
| | | | | 307/44 |
| 8,658,299 | B2 | 2/2014 | Yang et al. | |
| 8,847,426 | B2 | 9/2014 | Heap et al. | |
| 2007/0247003 | A1 | 10/2007 | Elder et al. | |
| 2009/0179616 | A1 * | 7/2009 | Ichikawa | B60L 3/0046 |
| | | | | 320/134 |
| 2011/0296855 | A1 | 12/2011 | Johnston et al. | |

(Continued)

FOREIGN PATENT DOCUMENTS

| CN | 104795610 A | 7/2015 |
| EP | 1316460 A1 | 6/2003 |

(Continued)

OTHER PUBLICATIONS

Schiffer et al., "Heat Generation in Double Layer Capacitors," Journal of Power Sources, Feb. 7, 2006.

(Continued)

*Primary Examiner* — Antony M Paul
(74) *Attorney, Agent, or Firm* — James Dottavio; Brooks Kushman P.C.

(57) ABSTRACT

A hybrid thermal management system includes a battery, a capacitor, and a controller programmed to, responsive to a demand and a temperature being less than an upper threshold, select and operate only one of the battery and capacitor to satisfy the demand according to which of two values, corresponding to traction power dependent heat generation functions representing rates at which the battery and capacitor generate heat, is less to maintain the temperature below the threshold.

20 Claims, 9 Drawing Sheets

(56) References Cited

U.S. PATENT DOCUMENTS

| | | |
|---|---|---|
| 2012/0242144 A1 | 9/2012 | Chorian et al. |
| 2012/0282497 A1 | 11/2012 | Yang et al. |
| 2013/0033203 A1 | 2/2013 | Luke et al. |
| 2013/0188283 A1 | 7/2013 | Midholm et al. |
| 2015/0149799 A1 | 5/2015 | Ye et al. |
| 2015/0214586 A1 | 7/2015 | Yeow et al. |
| 2015/0236386 A1 | 8/2015 | Yang et al. |

FOREIGN PATENT DOCUMENTS

| | | |
|---|---|---|
| WO | 2014120688 A1 | 8/2014 |
| WO | 2015066079 A1 | 5/2015 |

OTHER PUBLICATIONS

International Search Report and Written Opinion in International Application No. PCT/US2016/019443 dated Apr. 29, 2016.

\* cited by examiner

THERMAL MANAGEMENT SYSTEM FOR A HYBRID VEHICLE

TECHNICAL FIELD

This application generally relates to a system for thermal management of electrical components in a vehicle.

BACKGROUND

A vehicle includes various electrical loads. During operation, the electrical loads generate heat. The heat generated by the electrical loads may be excessive. Some electrical loads may be actively cooled to maintain the electrical load at a temperature less than a predefined threshold. Various components and system configurations are available for cooling electrical loads. Some include routing coolant lines to a heat exchanger coupled to the load to remove heat through the coolant.

SUMMARY

According to one embodiment, a hybrid thermal management system includes a battery, a capacitor, and a controller programmed to, responsive to a demand and a temperature being less than an upper threshold, select and operate only one of the battery and capacitor to satisfy the demand according to which of two values, corresponding to traction power dependent heat generation functions representing rates at which the battery and capacitor generate heat, is less to maintain the temperature below the threshold.

According to another embodiment, a hybrid thermal management system includes a controller programmed to responsive to a state of a battery exceeding a threshold, assign power required from the battery and a capacitor to satisfy a demand of the system based on heat generation functions representing rates at which the battery and capacitor generate heat such that the assigned powers are minimized to minimize heat generation of the capacitor and battery. The controller is further programmed to, responsive to the state being less than the threshold, assign the power such that the assigned powers are maximized to maximize heat generation of the capacitor and battery.

According to another embodiment, a hybrid thermal management system includes a battery, a capacitor, and a controller programmed to assign power required from each of the battery and the capacitor to satisfy a demand of the system. The assigned power is based on a state of at least one of the battery and the capacitor and heat generation functions representing rates at which the battery and the capacitor generate heat such that for a given value of the demand, the assigned power maximizes heat generated by the battery and capacitor when the state is less than a lower threshold and minimizes the heat generated when the state is greater than an upper threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
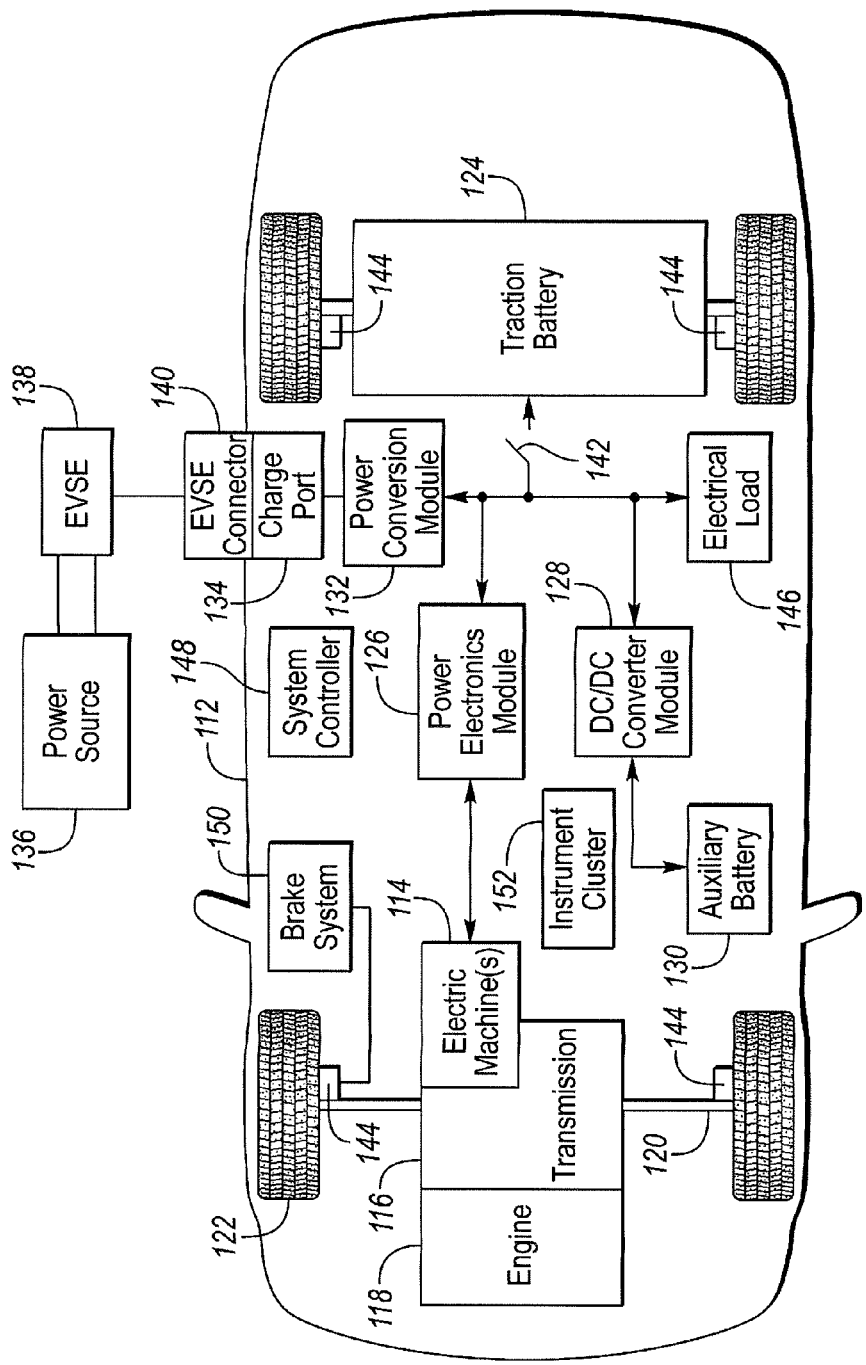
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that can be used by the electric machines 114. A vehicle battery pack 124 typically provides a high voltage direct current (DC) output. The traction battery 124 may be electrically coupled to one or more power electronics modules. One or more contactors 142 may isolate the traction battery 124 from other components when opened and connect the traction battery 124 to other components when closed. The power electronics module 126 may also be electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to an electric machine 114 and the engine 118 may not be present.

In addition to providing energy for propulsion, the traction battery 124 may provide energy for other vehicle electrical systems. A vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery). The low-voltage systems may be electrically coupled to the auxiliary battery. Other high-voltage loads 146, such as compressors and electric heaters, may be coupled to the high-voltage output of the traction battery 124. The electrical loads 146 may have an associated controller that operates and controls the electrical loads 146 when appropriate.

The vehicle 112 may be an electric vehicle or a plug-in hybrid vehicle in which the traction battery 124 may be recharged by an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system connections may be hydraulic and/or electrical. The brake system 150 may include a controller to monitor and coordinate operation of the wheel brakes 144. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
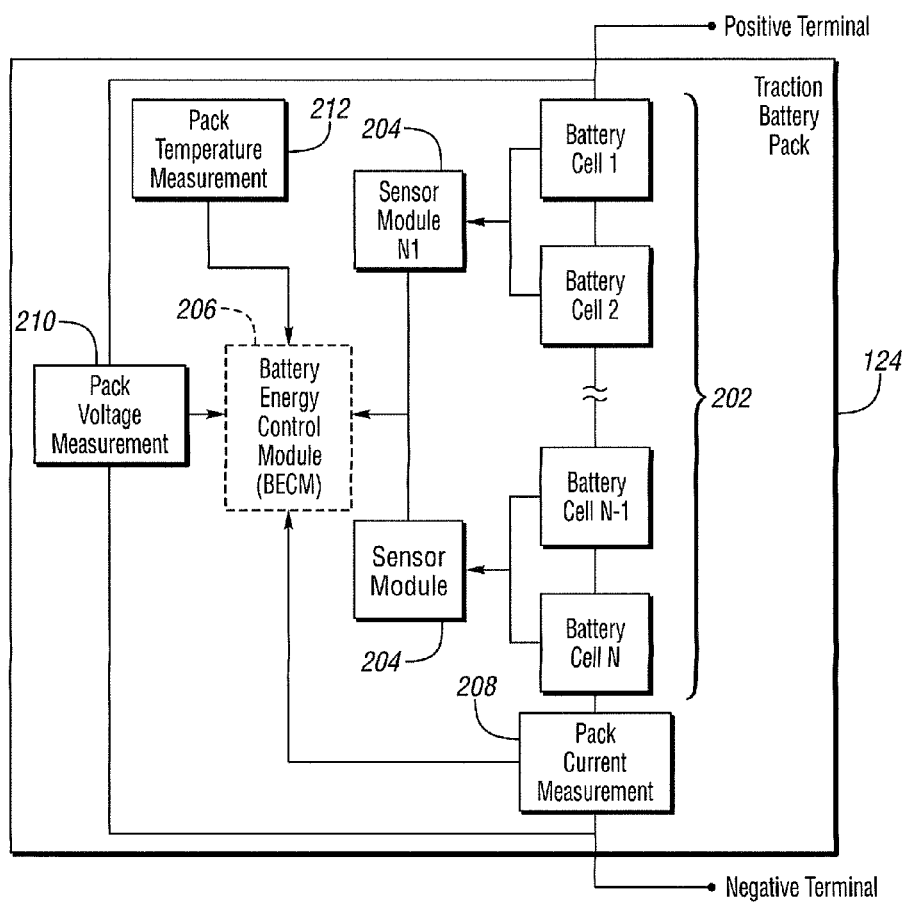
FIG. 2 is a diagram of a possible battery pack arrangement comprised of multiple cells, and monitored and controlled by a Battery Energy Control Module.

The traction battery 124 may be constructed from a variety of chemical formulations. Typical battery pack chemistries may be lead acid, nickel-metal hydride (NIMH) or Lithium-Ion. FIG. 2 shows a typical traction battery pack 124 in a simple series configuration of N battery cells 202. Other battery packs 124, however, may be composed of any number of individual battery cells connected in series or parallel or some combination thereof. A battery management system may have one or more controllers, such as a Battery Energy Control Module (BECM) 206, that monitor and control the performance of the traction battery 124. The battery pack 124 may include sensors to measure various pack level characteristics. The battery pack 124 may include one or more pack current measurement sensors 208, pack voltage measurement sensors 210, and pack temperature measurement sensors 212. The BECM 206 may include circuitry to interface with the pack current sensors 208, the pack voltage sensors 210 and the pack temperature sensors 212. The BECM 206 may have non-volatile memory such that data may be retained when the BECM 206 is in an off condition. Retained data may be available upon the next key cycle.

In addition to the pack level characteristics, there may be battery cell 202 level characteristics that are measured and monitored. For example, the terminal voltage, current, and temperature of each cell 202 may be measured. A system may use one or more sensor modules 204 to measure the battery cell 202 characteristics. Depending on the capabilities, the sensor modules 204 may measure the characteristics of one or multiple of the battery cells 202. The battery pack 124 may utilize up to $N_c$ sensor modules 204 to measure the characteristics of all the battery cells 202. Each of the sensor modules 204 may transfer the measurements to the BECM 206 for further processing and coordination. The sensor modules 204 may transfer signals in analog or digital form to the BECM 206. In some configurations, the functionality of the sensor modules 204 may be incorporated internally to the BECM 206. That is, the hardware of the sensor modules 204 may be integrated as part of the circuitry in the BECM 206 and the BECM 206 may handle the processing of raw signals. The BECM 206 may also include circuitry to interface with the one or more contactors 142 to open and close the contactors 142.

The traction battery 124 may operate more effectively in a particular temperature range. The traction battery 124 may include components for heating and cooling the traction battery 124 to maintain the battery temperature within an acceptable operating range. The thermal system may be an air-cooling system and/or a fluid cooling system. The additional thermal system adds components and cost to the battery pack. In addition, the potential for leaking fluid is undesirable in the battery pack environment. Further, operation of fans and pumps may increase audible noise in the vehicle. Other means of cooling the traction battery 124 are desirable.

It is possible to take advantage of a change in entropy inherent in the charge/discharge of electrochemical devices—such as capacitors. A capacitor may function by arranging electrically charged ions on opposite sides of electrode plates that are separated by a dielectric material. During charging, the ions are arranged near the electrode plates. Upon discharge, the charge separation is removed when a circuit is closed coupling the two opposing electrode plates. During discharge, the ions move between the electrode plates. The resulting behavior links the charge/discharge behavior with a change in entropy or the state of disorder of the system. With respect to the ions, entropy or disorder is decreased during charging and increased during discharging. Any change in entropy of the ions is offset by an opposite change in entropy of the capacitor.

It is observed that a temperature of a capacitor decreases as the capacitor is discharged. As the entropy of the ions increases during discharging, the entropy of the capacitor is decreasing. The amount of temperature decrease may depend on the discharge rate of the capacitor. Conversely, as the capacitor is charged, the temperature of the capacitor increases. The amount of temperature increase may depend on the charge rate of the capacitor. A net temperature decrease may be achieved by discharging the capacitor at a discharge rate that is greater than the charge rate of the capacitor.

The temperature change of the capacitor is a result of a change in entropy of the capacitor. As the capacitor is charged and discharged, charge on the capacitor changes order to a more ordered state or more disordered state. The change in entropy of the capacitor may be governed by:

$$\Delta S = -2NK_b \ln\left(\frac{V_f}{V_i}\right)$$

where N is the number of ions, $K_b$ is Boltzmann's constant, and V is the volume occupied by the ions at a final (subscript f) and an initial (subscript i) time.

Another component of the temperature change of the capacitor is Joule heating due to the resistance of the capacitor. The Joule heating component is present during charging and discharging and is not reversible. Current flowing into and out of the capacitor creates heat due to the resistance of the capacitor.

Figure 3:
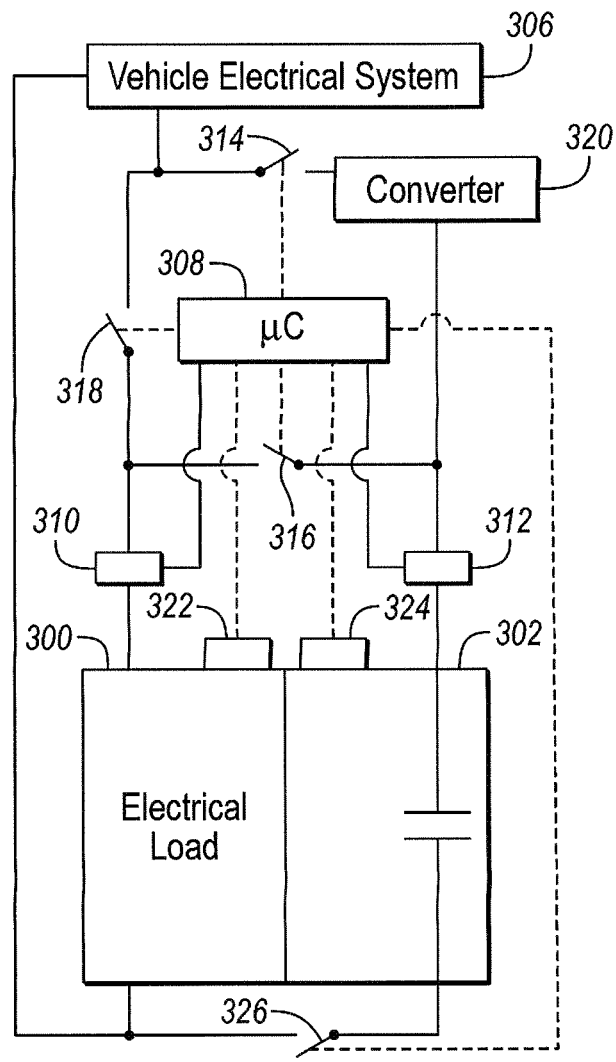
FIG. 3 is a diagram of a capacitor thermally coupled to an electrical load.

FIG. 3 depicts a configuration of a capacitor 302 in thermal contact with an electrical load 300. The electrical load 300 may be any electrical element or device. The electrical load 300 may be capable of sourcing and/or consuming electrical energy. The capacitor 302 may be a double-layer capacitor often referred to as a supercapacitor. The capacitor 302 may be arranged to be in thermal contact with the electrical load 300. For example, the capacitor 302 may be formed around a boundary of the electrical load 300 such that the capacitor 302 contacts an outer surface or sides of the electrical load 300. The capacitor 302 may be configured to maximize an amount of surface area that is in thermal contact with the electrical load 300. In some configurations, the capacitor 302 may be arranged to be in thermal contact with a base of the electrical load 300. Terminals of the capacitor 302 may be electrically coupled to terminals of the electrical load 300 such that the electrical load 300 and the capacitor 302 are electrically connected in parallel.

A controller 308 may be electrically coupled to the capacitor 302 and the electrical load 300. The controller 308 may include a processor or microcontroller that includes a processor along with volatile and non-volatile memory. The controller 308 may include additional circuitry for interfacing to the various components. The additional circuitry may provide isolation and scaling of signals for inputs and outputs of the controller 308. The capacitor 302 may be selectively electrically coupled to the terminals of the electrical load 300 via a first switching element 316. The switching elements referenced herein may be solid-state switching devices such as a transistor. In some configurations, the switching elements may be relays. The particular choice of the switching elements will depend on the voltage and current levels specified for the application. Control signals for the switching elements may be electrically coupled to the controller 308. The controller 308 may selectively couple the capacitor 302 to the electrical load 300 by controlling the first switching element 316.

The electrical load 300 may experience temperature changes as current passes through the device. The electrical load 300 may be a battery cell or a battery pack. The battery cell may experience temperature changes due to Joule heating and chemical reactions within the battery cell. Generally, additional means of cooling the battery are present. Some configurations may include air-cooling or liquid-cooling. The capacitor 302 may be controlled to provide some cooling of the battery cell. The charge and discharge rates of the capacitor 302 may be controlled such that the capacitor entropy is decreased (e.g., temperature decreases). As the capacitor 302 is in thermal contact with the electrical load 300, some cooling of the electrical load 300 will take place.

The electrical load 300 and the capacitor 302 may be electrically coupled to a vehicle electrical system 306. The vehicle electrical system 306 may include a power source or an on-board generator. The vehicle electrical system 306 may include additional electrical loads. The vehicle electrical system 306 may be electrically coupled to the terminals of the electrical load 300. The vehicle electrical system 306 may be selectively electrically coupled to the capacitor 302 via a second switching element 314. This allows the capacitor 302 to be charge and discharge via the vehicle electrical system 306. Furthermore, the capacitor 302 may deliver power to a traction motor of the vehicle electrical system 306 to meet a traction demand when the switching element 314 is closed. The switching element 314 may be open for instances in which the electrical load 300 (e.g., a battery) is desired to be the sole power source, and not the capacitor 302. In some configurations, the vehicle electrical system 306 may be electrically coupled to the capacitor 302 via a voltage converter 320. The voltage converter 320 may be a DC/DC converter configured as a boost, buck, or boost/buck converter. The voltage converter 320 may be configured to provide a predetermined voltage to the capacitor 302. In configurations in which the electrical load 300 is a battery cell, the predetermined voltage may be a voltage level that is greater than a nominal voltage level of the battery cell. Note that the voltage converter 320 is not necessarily present in all applications.

A third switching element 318 may be present to selectively couple the vehicle electrical system 306 to the electrical load 300. The third switching element 318 permits the electrical load 300 to be isolated from the vehicle electrical system 306. The electrical load 300 may be electrically coupled to one or both of the vehicle electrical system 306 and the capacitor 302. Furthermore, the electrical load 300 (e.g., a battery) may deliver power to the traction motor of the vehicle electrical system 306 to meet a traction power demand when the switching element 318 is closed. The switching element 318 may be open for instances in which the capacitor 302 is desired to be the power source, and not the electrical load 300. FIG. 3 depicts switching devices for only one terminal of the electrical load 300 and the capacitor 302. However, additional switching devices may be present on return terminals of the electrical load 300 and the capacitor 302. For example, a fourth switching element 326 may be coupled between a return terminal of the capacitor 302 and a return terminal of the electrical load 300. In one embodiment, the switching element 326 may be open when the battery is the sole power source (for delivering energy to meet traction demand). In one embodiment, the switching element 326 may be closed when the capacitor is the sole power source or when both the battery and capacitor are power sources.

The controller 308 may be programmed to control the switching devices. A first measurement device 310 may be configured to provide voltage and/or current measurements associated with the electrical load 300. A second measurement device 312 may be configured to provide voltage and/or current measurements associated with the capacitor 302. Voltage measurement may be accomplished using a voltage divider network coupled to an analog-to-digital (A/D) input of the controller 308. Current measurement may be accomplished using a coil or Hall effect device coupled to another A/D input of the controller 308. The first measurement device 310 may be coupled to terminals of the electrical load 300. The second measurement device 312 may be coupled to terminals of the capacitor 302.

The switching devices 314, 316, 318, 326 may be controlled such that the capacitor 302 is charged to a predetermined voltage at a charging rate. During capacitor charging the capacitor 302 may be isolated from the electrical load 300 (e.g., switching element 316 open and 314 closed). When conditions are appropriate, the capacitor 302 may be coupled to the electrical load 300 (e.g., switching element 316 closed). In one embodiment, switching element 316 may be open when either the battery or capacitor is delivering power to the traction motor of the vehicle electrical system 306 to meet the traction demand. When both the battery and capacitor are commanded to deliver power to the traction motor to meet the traction demand, switching element 316 may be open or closed depending on the application and system. One of ordinary skill in the art will understand that there are many other electrical configurations that may be utilized, other than what is shown and described herein. For example and without limitation, more or less switching elements may be utilized. The vehicle electrical system 306 may be isolated from the electrical load 300 and the capacitor 302 (e.g., switching element 314 and 318 open). At this time, the capacitor 302 may be discharged into the electrical load 300 at a discharging rate. The conditions for performing the discharge may include the capacitor voltage being a predetermined voltage above the electrical load voltage. Conditions for performing the discharge may include a demand for cooling of the electrical load 300. The discharging rate may be selected to be greater than the charging rate so that the capacitor temperature decreases. The discharging rate may be selected as a discharge current at which entropic cooling of the capacitor is greater than Joule heating of the capacitor. The discharge of the capacitor 302 causes the temperature of the capacitor 302 to decrease. As the capacitor 302 is in thermal contact with the electrical load 300, the electrical load temperature may decrease as well. The charge rate of the capacitor 302 may be selected as a charge current at which the total heating of the capacitor is less than the entropic cooling of the capacitor caused by the discharge current.

An electrical load temperature sensor 322 may be in thermal contact with the electrical load 300 and electrically coupled to the controller 308. A capacitor temperature sensor 324 may be in thermal contact with the capacitor 302 and electrically coupled to the controller 308. The controller 308 may process temperature readings such that an electrical load temperature and a capacitor temperature are available for control logic. The demand for cooling of the electrical load 300 may be derived from the temperature readings. For example, when the temperature associated with the electrical load 300 exceeds a predetermined threshold, cooling may be requested.

The components may be part of a thermal management system for the electrical load 300. The electrical load may include various electrical devices such as coils and power semiconductors (e.g., IGBT). During operation these electrical devices may generate heat and benefit from thermal management to maintain the temperature within a predetermined range. In applications in which the electrical load 300 is a battery, the components may be part of the battery management system. For example, the components may be incorporated into the BECM 206.

The discharge current may be selected to provide a net cooling effect. When the discharge current exceeds a predetermined level, Joule heating of the capacitor 302 may begin negating the cooling effect. If the discharge current is selected as too large, the Joule heating effects may dominate and actually cause a temperature increase of the capacitor 302. The discharge current may be selected to optimize the cooling effect and minimize the impact of the associated Joule heating of the capacitor 302.

Figure 4A:
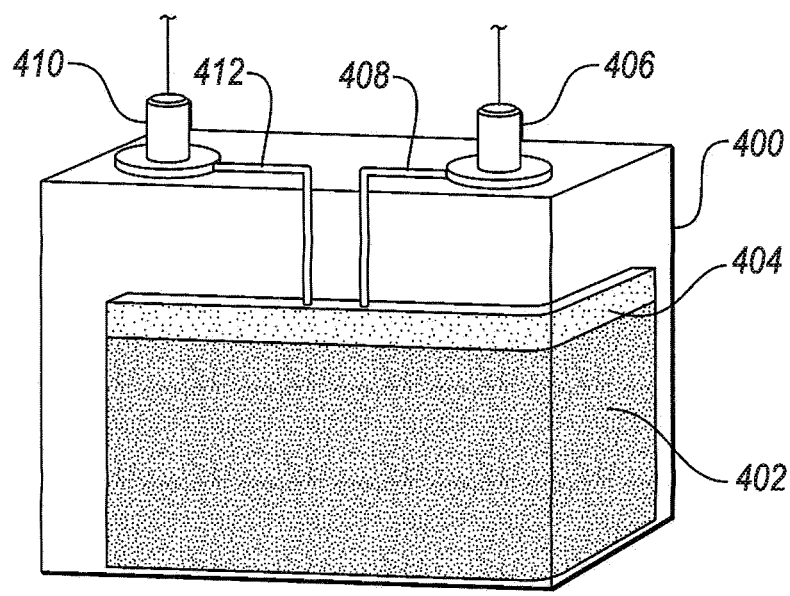
FIG. 4A is a diagram of a capacitor thermally and electrically coupled to a battery cell to provide cooling for the battery cell.

FIG. 4A depicts a possible configuration for battery cell cooling. A battery cell capacitor 402 may be thermally coupled to a battery cell 400. A balancing controller 404 may be coupled between the battery cell capacitor 402 and battery cell terminals 406 and 410. Circuits 408 and 412 may couple the balancing controller 404 to the battery cell terminals 406 and 410 respectively. The circuits 408 and 412 may include additional sensing or control circuitry. Other methods and configurations are possible for integrating the battery cell capacitor 402 and balancing controller 404 to the battery cell 400. In some configurations, the battery cell capacitor 402 may be configured to wrap around a surface of the battery cell 400 to maximize thermal contact with the battery cell 402.

The added benefit of utilizing the capacitor 302 in thermal contact with the traction battery 124 or battery cells 202 is that battery cell balancing may be achieved. The additional hardware may aid in cooling of the traction battery 124 and balancing the battery cells 202. The effect on cooling may permit resizing of other thermal management devices and improve noise characteristics of the thermal management system.

Figure 4B:
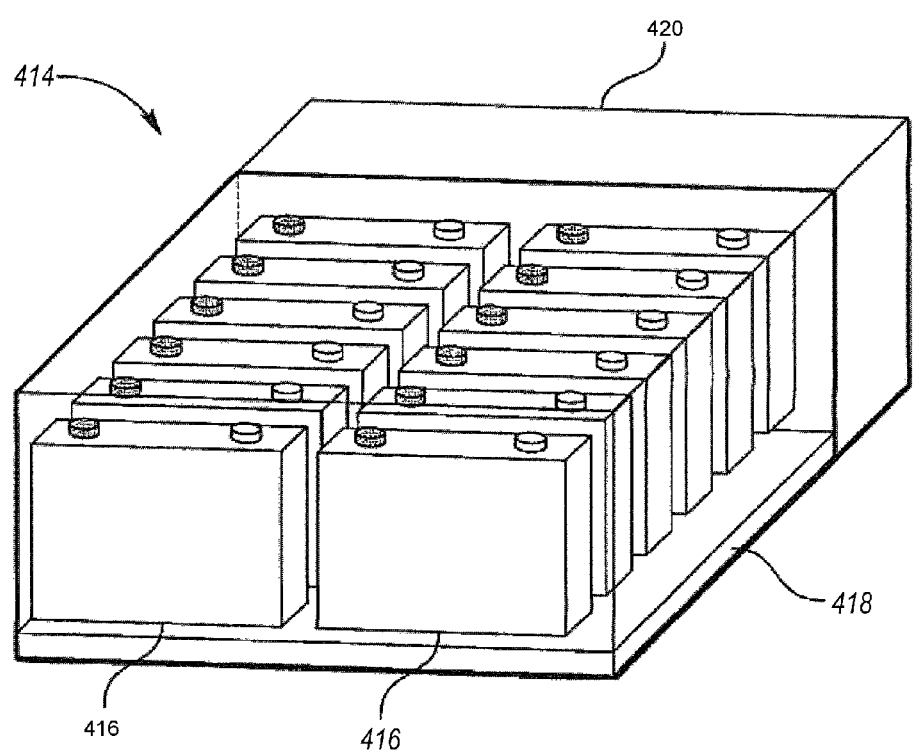
FIG. 4B is a diagram of a capacitor thermally coupled to a battery pack for cooling the battery pack.

FIG. 4B depicts a possible configuration for battery pack cooling. A battery pack 414 may include a plurality of battery cells 416. A battery pack capacitor 418 may be thermally coupled to the battery cells 416. The battery pack capacitor 418 may be electrically coupled to terminals of the battery pack 414. For example, the battery pack capacitor 418 may be arranged on a floor of a housing to support the battery cells 416. In other configurations, the battery pack capacitor 418 may wrap around the battery cells 416 and thermally contact sides of the battery cells 416. A battery management system 420 may be included in the battery pack 414 and include the circuitry and controller for managing the battery pack capacitor 416 in the manner described.

Figure 5:
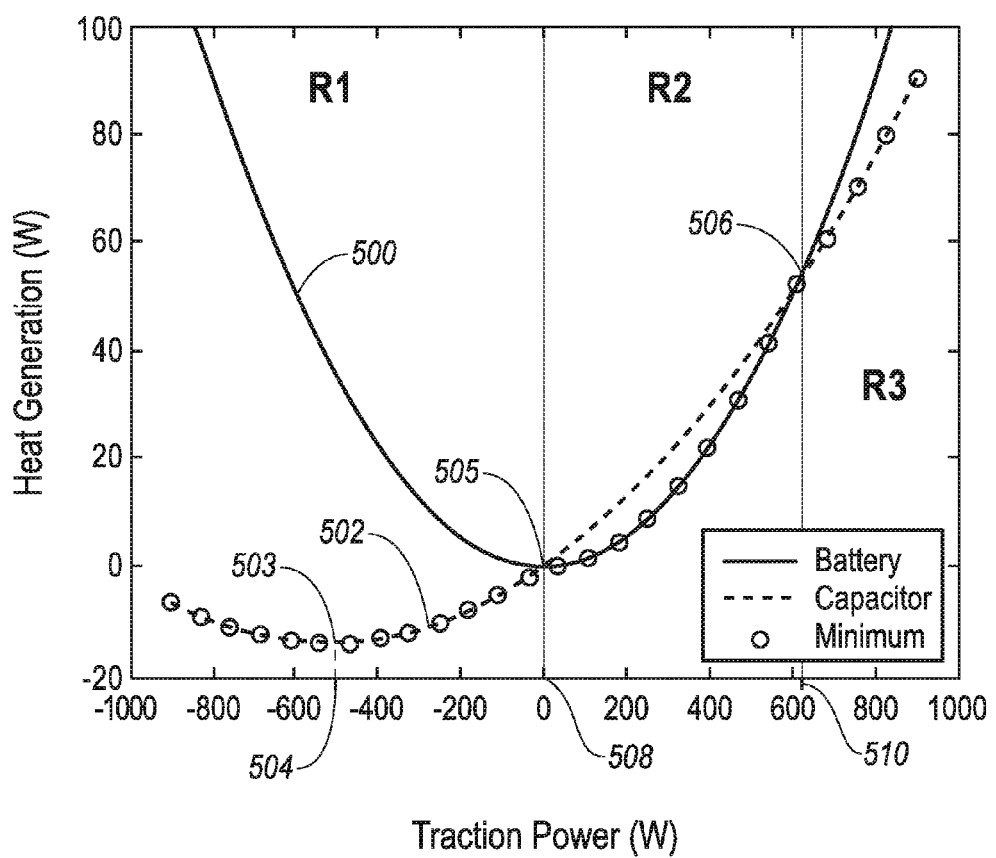
FIG. 5 is a traction power plot illustrating heat generation for a battery and a capacitor upon delivering traction power.

FIG. 5 is a traction power plot illustrating heat generation for a battery and a capacitor upon delivering traction power. The referenced battery and capacitor may be any of the aforementioned batteries and capacitors, respectively. Battery curve 500 may correspond to a traction power dependent heat generation function representing a rate at which the battery generates heat upon delivering the traction power for a given state-of-charge (SOC) and temperature of the battery. Capacitor curve 502 may correspond to a traction power dependent heat generation function representing a rate at which the capacitor generates heat upon delivering the traction power for a given state-of-charge and temperature of the capacitor. Battery curve 500 illustrates heat generation based on traction power demand for a battery, and capacitor curve 502 illustrates heat generation based on traction power demand for a capacitor. Battery curve 500 may have a parabolic shape with a vertex at a traction power and heat generation of zero. Battery curve 500 may be generally symmetric relative to an origin (traction power and generation values of zero) due to the dominance of ohmic heating. As such, the battery may generate the same amount of heat for the same numerical value of traction power demand, whether positive or negative. As the absolute value of traction power increases from zero, the resulting heat generated from the battery may also increase. Capacitor curve 502 may be asymmetric relative to the origin, due to the significant contribution of entropic heating as compared to the battery system, and have a minimum heat generation value 503 at a traction power value 504 that is less than zero. As traction power increases from value 504, the resulting heat generated from the capacitor may also increase.

Still referring to FIG. 5, capacitor curve 502 may intersect with battery curve 500 at points 505, 506. Points 505, 506 may represent traction power thresholds 508, 510. As such, thresholds 508, 510 may be defined by the traction power dependent heat generation functions and may correspond to values of traction power at which the heat generation rates of the battery and capacitor are equal. In on embodiment, threshold 508 is zero. To deliver traction power less than threshold 508, the capacitor may generate less heat than the battery (denoted as region "R1" in the plot). To deliver traction power between thresholds 508 and 510 (denoted as region "R2" in the plot), the battery may generate less heat than the capacitor. To deliver traction power greater than threshold 510 (denoted as region "R3" in the plot), the capacitor may generate less heat than the battery. In one embodiment, a controller may be programmed to select the capacitor and/or battery to deliver the traction power demanded based on states of the battery and/or capacitor at the time of traction power demand. For example, if states of the battery and/or capacitor warrant generating as little heat as possible (upon delivering the traction power demand), then controller may select the component (battery or capacitor) that would generate the least amount of heat for the given traction power demand.

Figure 6:
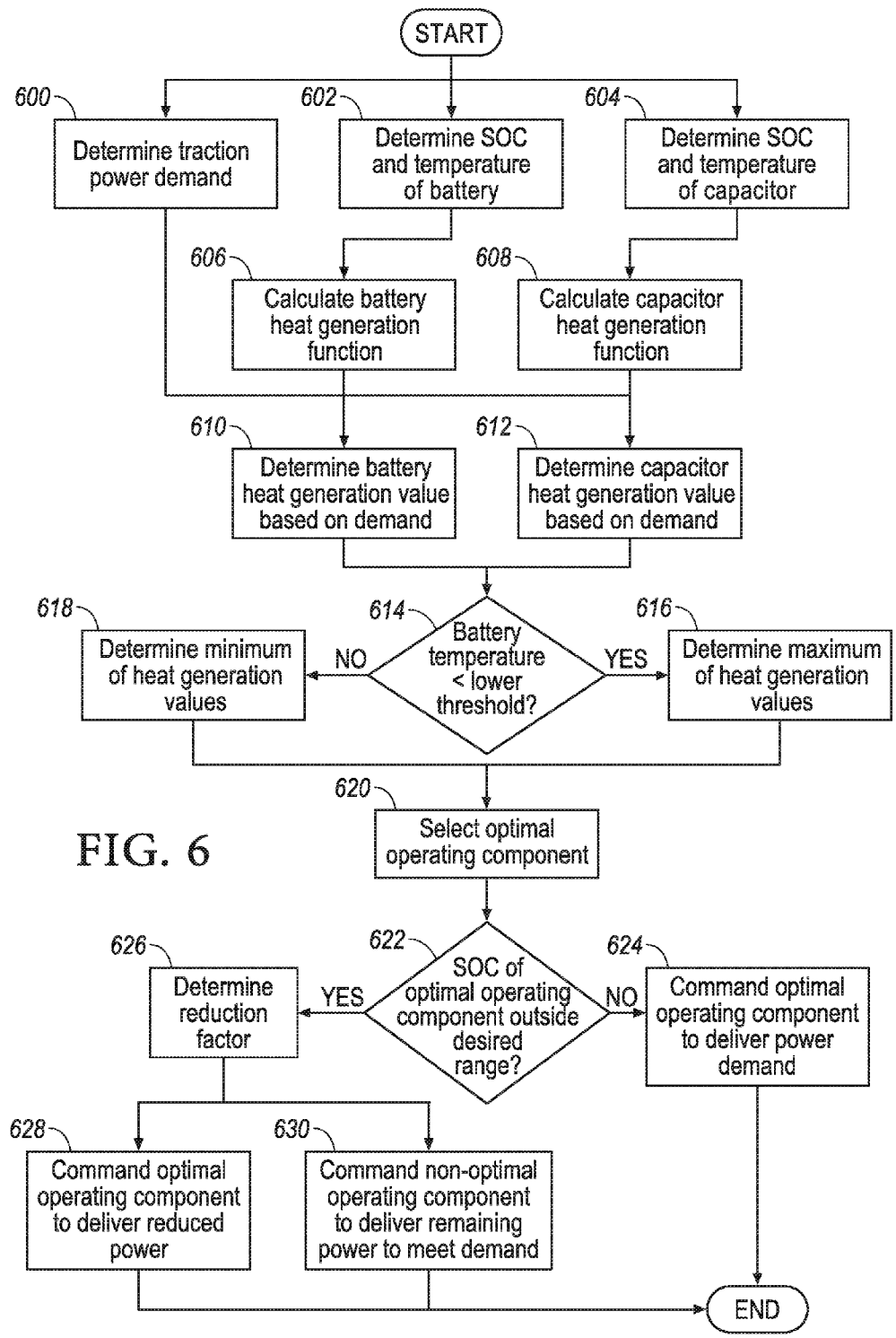
FIG. 6 is a flowchart corresponding to a method of delivering a traction power demand based on states of a traction battery and capacitor according to an embodiment of the present disclosure.

FIG. 6 is a flowchart corresponding to a method of delivering a traction power demand based on states of a traction battery and capacitor according to an embodiment of the present disclosure. The referenced battery and capacitor may be any of the aforementioned batteries and capacitors, respectively. Furthermore, the disclosed methods may be performed by one, some, or all of the aforementioned controllers and control modules. The method may begin with the step 600 of determining a traction power demand. The traction power demand may be based on a total power demand. The total power demand may be delivered by the engine and/or electric motor. In some embodiments, the traction power demand is calculated in step 600; in other embodiments, the traction power demand is an input at step 600 (i.e., traction power demand is previously calculated).

The method may continue with the steps 602, 604 of determining a SOC and temperature of the battery and capacitor. The SOC and temperature may be detected by the aforementioned sensors.

The method may continue with the steps 606, 608 of calculating battery and capacitor heat generation functions. The battery heat generation function is based on the SOC and temperature of the battery determined in step 602, and the capacitor heat generation function is based on the SOC and temperature of the capacitor determined in step 604. In one embodiment, the heat generation functions may be similarly shaped to curves 500, 502 illustrated in FIG. 5. In one embodiment, the functions are stored in the controller as a series of lookup tables with each table being specific to a SOC and temperature of the respective component(s) (battery and/or capacitor). The tables may associate heat generated based on traction power demand. In another embodiment, the functions are stored in the controller as actual functions with SOC and temperature of the respective component(s) being variables (i.e., inputs to the function). Although step 600 is illustrated as being performed in parallel with steps 602, 604, 606, 608, step 600 may be performed sequentially before or after steps 602, 604, 606, 608.

The method may continue with the steps 610, 612 of determining a battery heat generation value and capacitor heat generation value based on the traction power demand. The heat generation values are the amount of heat the respective component would generate if it delivered the power needed to meet the traction power demand. The heat generation values may be based on the demand and of the respective temperatures and SOCs of the battery and capacitor (determined in steps 602, 604). The controller may determine the heat generation values by solving the respective functions calculated in steps 606, 608 (by inputting the respective SOC and temperature) or by indexing the appropriate lookup tables (based on the respective SOC and temperature). Although the aforementioned steps are illustrated as being performed in parallel, the steps may be performed sequentially.

The method may continue with the step 614 of determining whether the battery temperature (determined in step 602) falls below a lower threshold. As discussed above, it may be desirable to maintain the temperature of the battery within a desired operating temperature range. In one embodiment, the desired operating temperature range may be −40 degrees Celsius to 100 degrees Celsius. In another embodiment, the desired operating temperature may be −10 degrees Celsius to 40 degrees Celsius. In one embodiment, the lower threshold may be a minimum temperature of the desired operating temperature range. In one embodiment, the lower threshold is a fixed value. In another embodiment, the lower threshold may vary depending on certain conditions. One of ordinary skill in the art will understand that there are other ways to determine whether more or less heat is desired other than by comparing the temperature of the battery to a predefined threshold. For example and without limitation, it may be desirable to maintain the temperature of the capacitor within a desired operating temperature range, similar to that described above with respect to the battery. Furthermore, an upper end or maximum temperature of the desired operating range may be utilized. In one embodiment, the controller may be programmed to select only the battery to deliver power to the motor when the temperature of the battery is within the desired operating temperature range.

If at step 614, the controller determines that the battery temperature falls below the lower threshold, the method may continue with the step 616 of determining a maximum of the heat generation values determined in steps 610, 612. The maximum may be the greater of the two heat generation values. If the battery temperature is below the lower threshold, then the battery temperature may be too low. As such, it may be desirable to generate more heat to increase the battery temperature such that the battery temperature falls within the desired operating temperature range.

If at step 614, the controller determines that the battery temperature does not fall below the lower threshold, the method may continue with the step 618 of determining a minimum of the heat generation values determined in steps 610, 612. The minimum may be the lesser of the two heat generation values. If the battery temperature is within or exceeds the desired operating temperature range, it may be desirable to generate as little heat as possible while delivering the traction power demand.

The method may continue with the step 620 of selecting an optimal operating component. The optimal operating component is the component associated with the minimum or maximum determined in steps 618 or 616 (depending on the outcome of condition step 614). For example and without limitation, if the battery temperature exceeds the predefined threshold, then the component associated with the minimum heat generation value (i.e., the lesser of the two heat generation values) is the ideal component to deliver the traction power demand to generate as little heat as possible.

Figure 7:
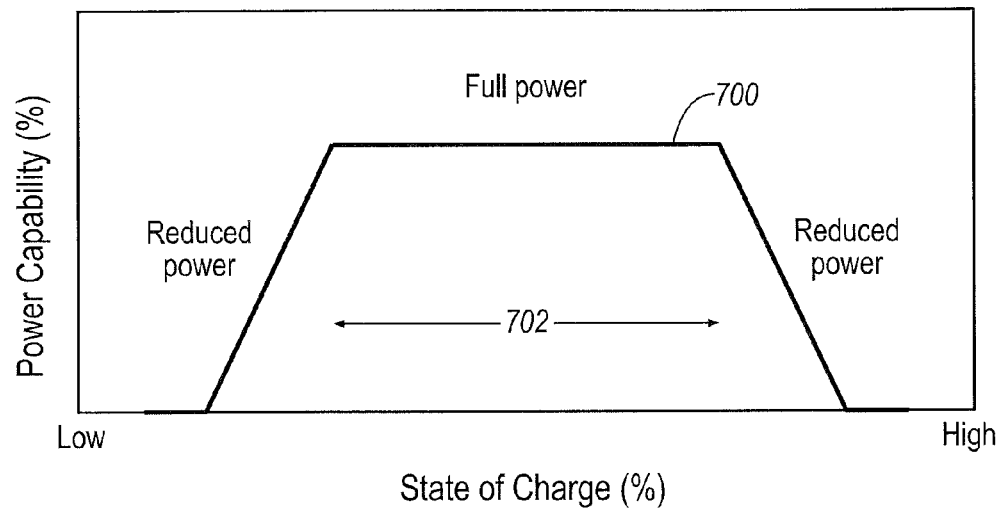
FIG. 7 is a plot associating power capability with state of charge for a battery or capacitor.

The method may continue with the step 622 of determining whether the SOC of the optimal operating component is outside a desired operating range. In one embodiment, the desired operating range may be 30% to 70% for full power and 20% to 80% for reduced power. If the SOC is outside a desired operating range, then the component may not be able to deliver the traction power demanded. Reference will now be made to FIG. 7, which is a plot associating power capability with SOC. Curve 700 may illustrate how power capability changes depending on SOC. For some electrical components, if the SOC is too low or too high, the component has a reduced power capability. In one embodiment, range 702 may be the desired operating range.

If at step 622, the controller determines that the SOC is within the desired operating range, the method may continue with the step 624 of commanding the optimal operating component to deliver the traction power demand. If at step 620, the controller determines that the SOC is outside the desired operating range, the method may continue with the step 626 of determining a reduction factor. The reduction factor may be expressed as a percentage and may be based on the power capability for the given SOC. For example and without limitation, the controller may reference a power capability function or lookup table that correlates SOC to power capability. In one embodiment, curve 700 in FIG. 7 may represent the power capability function, and the reduction factor may be the power capability determined as a function of SOC.

In another embodiment, step 620 is omitted, and the reduction is factor is determined when the SOC is within the desired operating range as well. If the SOC is within the desired operating range and, therefore, the optimal operating component is capable of delivering the traction power demand, then the reduction factor would be 100%. As such, the controller may be programmed to, responsive to (i) a traction power demand, (ii) a temperature of the battery being less than a predefined threshold, select and operate only one of the battery and capacitor to satisfy a demand according to which of two values, corresponding to traction dependent heat generation functions representing rates at which the battery and capacitor generate heat, is less when the SOC of the selected component is within the desired operating range to maintain the temperature below the predefined threshold.

The method may continue with the step 628 of commanding the optimal operating component to deliver a reduced traction power and, concurrently, with the step 630 of commanding a non-optimal operating component to deliver a remaining traction power (to meet the traction power demand determined step 600). The battery and/or capacitor may deliver the traction power demand through opening and/or closing of the aforementioned switching elements (FIG. 3). In one embodiment, the reduced traction power is the traction power demand times the reduction factor. For example and without limitation, if the reduction factor is 80%, then the controller commands the optimal operating component to deliver 80% of the traction power demand (i.e., the reduced traction power) and the non-optimal operating component to deliver the remaining traction power, which may be the traction power demand determined in step 600 minus the reduced traction power. Although steps 628, 630 are shown as being performed in parallel, steps 628, 630 may be performed sequentially.

The controller may further be programmed to, responsive to the SOC of the capacitor being less than a first calibratable threshold and a SOC of the battery being greater than a second calibratable threshold, command the battery to charge the capacitor. The first and second calibratable threshold may be the lower thresholds of the desired operating range for SOC (e.g., 20% to 80% for reduced power or 30% to 70% for full power), as described hereinabove. The battery may charge the capacitor when the capacitor is not delivering power to the motor. The battery may charge the capacitor before or after delivering power to the motor. The battery may also charge the capacitor upon delivering power to the motor as well.

Figure 8:
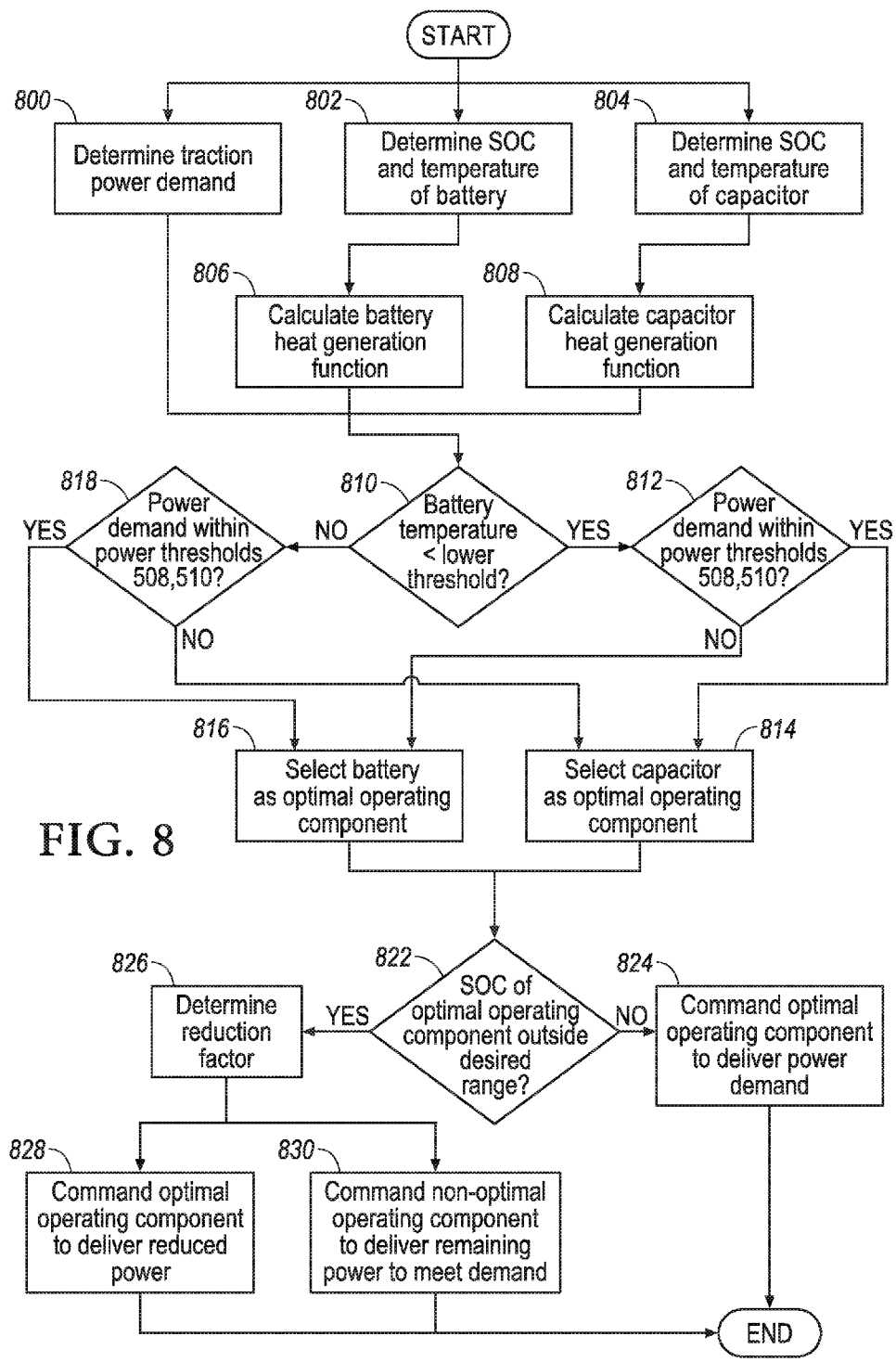
FIG. 8 is a flowchart corresponding to a method of delivering a traction power demand based on states of a traction battery and capacitor according to another embodiment of the present disclosure.

FIG. 8 is a flowchart corresponding to a method of delivering a traction power demand based on states of a traction battery and capacitor according to another embodiment of the present disclosure. The referenced battery and capacitor may be any of the aforementioned batteries and capacitors, respectively. Furthermore, the disclosed methods may be performed by one, some, or all of the aforementioned controllers and control modules. The method may begin with the step 800 of determining a traction power demand. The traction power demand may be based on a total power demand. The total power demand may be delivered by the engine and/or electric motor. In some embodiments, the traction power demand is calculated in step 800; in other embodiments, the traction power demand is an input at step 800 (i.e., traction power demand is previously calculated).

The method may continue with the steps 802, 804 of determining a state-of-charge (SOC) and temperature of the battery and capacitor. The SOC and temperature may be detected by the aforementioned sensors.

The method may continue with the steps 806, 808 of calculating battery and capacitor heat generation functions. The battery heat generation function is based on the SOC and temperature of the battery determined in step 802, and the capacitor heat generation function is based on the SOC and temperature of the capacitor determined in step 804. In one embodiment, the heat generation functions may be similarly shaped to curves 500, 502 illustrated in FIG. 5. In one embodiment, the functions are stored in the controller as a series of lookup tables with each table being specific to a SOC and temperature of the respective component(s) (battery and/or capacitor). The tables may associate heat generated based on traction power demand. In another embodiment, the functions are stored in the controller as actual functions with SOC and temperature of the respective component(s) being variables (i.e., inputs to the function). Although step 800 is illustrated as being performed in parallel with steps 802, 804, 806, 808, step 800 may be performed sequentially before or after steps 802, 804, 806, 808.

The method may continue with the step 809 of determining traction power thresholds 508, 510 (FIG. 5). Thresholds 508, 510 are the values of traction power at which the heat generation functions intersect.

The method may continue with the step 810 of determining whether the battery temperature (determined in step 802) falls below a lower threshold. As discussed above, it may be desirable to maintain the temperature of the battery within a desired operating temperature range. In one embodiment, the desired operating temperature range may be −40 degrees Celsius to 100 degrees Celsius. In another embodiment, the desired operating temperature may be −10 degrees Celsius to 40 degrees Celsius. In one embodiment, the lower threshold may be a minimum temperature of the desired operating temperature range. In one embodiment, the lower threshold is a fixed value. In another embodiment, the lower threshold may vary depending on certain conditions. One of ordinary skill in the art will understand that there are other ways to determine whether more or less heat is desired other than by comparing the temperature of the battery to a predefined threshold. Furthermore, an upper end or maximum temperature of the desired operating range may be utilized. In one embodiment, the controller may be programmed to select only the battery to deliver power to the motor when the temperature of the battery is within the desired operating temperature range.

If at step 810, the controller determines that the battery temperature falls below the lower threshold, the method may continue with the step 812 of determining whether the traction power demand is within upper and lower traction power thresholds 508, 510 (FIG. 5) (i.e., whether traction power demand is greater than or equal to lower threshold 508 and less than or equal to upper threshold 510). If the controller determines that the traction power demand is within thresholds 508, 510, and the temperature of the battery falls below a lower threshold, then it may be desirable to generate more heat to increase the battery temperature such that the battery temperature falls within the desired operating temperature range. As such, the method may continue with the step 814 of selecting the capacitor as the optimal operating component since, as shown in FIG. 5, between thresholds 508, 510, the capacitor generates more heat upon delivering the traction power demand determined in step 800.

If at step 812, the controller determines that the power demand does not fall within thresholds 508, 510, then the controller may continue with the step 816 of selecting the battery as the optimal operating component since, as shown in FIG. 5, outside thresholds 508, 510, the battery generates more heat than the capacitor upon delivering the traction power demand determined in step 800.

If at step 810, the controller determines that the battery temperature exceeds the lower threshold, then the controller may continue with the step 818 of determining whether the traction power demand is within upper and lower traction power thresholds 508, 510 (FIG. 5) (i.e., whether traction power demand is greater than or equal to lower threshold 508 and less than or equal to upper threshold 510). The condition of step 818 is similar to the condition in step 812, except the outcomes are reversed. If the controller determines that the traction power demand is within thresholds 508, 510, and the temperature of the battery exceeds the lower threshold, then it may be desirable to generate as little heat as possible while delivering the traction power demand. As such, the method may continue with the step 816 of selecting the battery as the optimal operating component since, as shown in FIG. 5, between thresholds 508, 510, the battery generates less heat upon delivering the traction power demand determined in step 800.

If at step 818, the controller determines that the power demand does not fall within thresholds 508, 510, then the controller may continue with the step 814 of selecting the capacitor as the optimal operating component since, as shown in FIG. 5, outside thresholds 508, 510, the capacitor generates less heat than the battery upon delivering the traction power demand determined in step 800.

The method may continue with the step 822 of determining whether the SOC of the optimal operating component is outside a desired operating range. In one embodiment, the desired operating range may be 30% to 70% for full power and 20% to 80% for reduced power. If the SOC is outside a desired operating range, then the component may not be able to deliver the traction power demanded.

If at step 822, the controller determines that the SOC is within the desired operating range, the method may continue with the step 824 of commanding the optimal operating component to deliver the traction power demand. If at step 820, the controller determines that the SOC is outside the desired operating range, the method may continue with the step 826 of determining a reduction factor. The reduction factor may be expressed as a percentage and may be based on the power capability for the given SOC. For example and without limitation, the controller may reference a power capability function or lookup table that correlates SOC to power capability. In one embodiment, curve 700 in FIG. 7 may represent the power capability function, and the reduction factor may be the power capability determined as a function of SOC.

In another embodiment, step 820 is omitted, and the reduction is factor is determined when the SOC is within the desired operating range as well. If the SOC is within the desired operating range and, therefore, the optimal operating component is capable of delivering the traction power demand, then the reduction factor would be 100%. As such, the controller may be programmed to, responsive to (i) a traction power demand, (ii) a temperature of the battery being less than a predefined threshold, select and operate only one of the battery and capacitor to satisfy a demand according to which of two values, corresponding to traction dependent heat generation functions representing rates at which the battery and capacitor generate heat, is less when the SOC of the selected component is within the desired operating range to maintain the temperature below the predefined threshold.

The method may continue with the step 828 of commanding the optimal operating component to deliver a reduced traction power and, concurrently, with the step 830 of commanding a non-optimal operating component to deliver a remaining traction power (to meet the traction power demand determined step 800). The battery and/or capacitor may deliver the traction power demand through opening and/or closing of the aforementioned switching elements (FIG. 3). In one embodiment, the reduced traction power is the traction power demand times the reduction factor. For example and without limitation, if the reduction factor is 80%, then the controller commands the optimal operating component to deliver 80% of the traction power demand (i.e., the reduced traction power) and the non-optimal operating component to deliver the remaining traction power, which may be the traction power demand determined in step 800 minus the reduced traction power. Although steps 828, 830 are shown as being performed in parallel, steps 828, 830 may be performed sequentially.

In one embodiment, the controller may be programmed to, responsive to a demand and a temperature being less than an upper threshold (e.g., an upper end of a desired operating range), select and operate only one of the battery and capacitor to satisfy the demand according to which of two values, corresponding to traction power dependent heat generation functions representing rates at which the battery and capacitor generate heat, is less to maintain the temperature below the threshold.

As illustrated, in one embodiment, the controller may be programmed to, responsive to a temperature of the battery exceeding a lower threshold (of the desired operating temperature range), assign power required from the battery and capacitor to satisfy the traction power demand of the system based on heat generation functions representing rates at which the battery and capacitor generate heat such that the assigned powers are minimized to minimize heat generation of the capacitor and battery upon satisfying the demand. The controller may be further programmed to, responsive to the temperature being less than the lower threshold, assign the power such that the assigned powers are maximized to maximize heat generation of the capacitor and battery upon satisfying the demand. The assigned power may be based on the demand, and the heat generation functions may be based on respective temperatures and states of charge of the battery and capacitor. Assigning the power may include selecting one of the battery and capacitor to be an optimal operating component. The controller may further be programmed to, responsive to the SOC of the operating component being outside a desired SOC operating range, decrease the assigned power of the optimal operating component by a reduction factor and increase the assigned power of the other of the battery and capacitor accordingly to meet the demand. Selecting one of the battery and capacitor to be the optimal operating component may include selecting the battery when the demand falls within thresholds 508, 510 upon the temperature of the battery exceeding the lower threshold, and selecting the capacitor when the demand is less than threshold 508 or greater than threshold 510 upon the temperature of the battery exceeding the lower threshold.

The controller may further be programmed to assign power required from each of a battery and a capacitor to satisfy a demand of the system, the assigned power being based on a state of at least one of the battery and the capacitor and heat generation functions representing rates at which the battery and the capacitor generate heat such that for a given value of the demand, the assigned power maximizes heat generated by the battery and capacitor when the state is less than a lower threshold and minimizes the heat generated when the state is greater than an upper threshold. The lower threshold may be the lower end of a desired operating range, and the upper threshold may be the upper end of the desired operating range.

The controller may further be programmed to, responsive to the SOC of the capacitor being less than a first calibratable threshold and a SOC of the battery being greater than a second calibratable threshold, command the battery to charge the capacitor. The first and second calibratable threshold may be the lower thresholds of the desired operating range for SOC (e.g., 20% to 80% for reduced power or 30% to 70% for full power), as described hereinabove. The battery may charge the capacitor when the capacitor is not delivering power to the motor. The battery may charge the capacitor before or after delivering power to the motor. The battery may also charge the capacitor upon delivering power to the motor as well.

Figure 9:
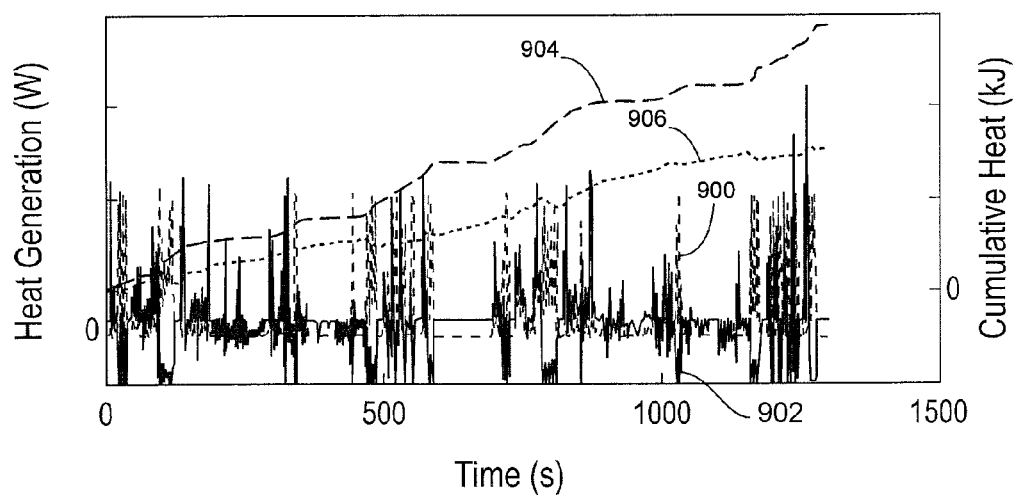
FIG. 9 is a time plot illustrating the thermal effects of the methods of FIG. 6 and FIG. 8.

FIG. 9 is a time plot illustrating the thermal effects of the methods of FIG. 6 and FIG. 8. Curve 900 illustrates the heat generated by a "battery-only system" having only a battery delivering traction power (i.e., no capacitor used to deliver traction power) over a given drive cycle. Curve 902 illustrates the heat generated by a "battery and capacitor system" disclosed herein over the same drive cycle, wherein the system includes a battery and a capacitor for delivering traction power and wherein the controller of the system selectively operates the battery and capacitor based on states of the battery and capacitor to maintain temperature of the battery within the desired operating temperature. As illustrated, operation of the battery-only system over the drive cycle resulted in heat generated in some time periods whereas operation of the battery and capacitor system over the same drive cycle generated no heat or had a cooling effect during those same time periods. Furthermore, curve 904 illustrates the cumulative heat generated by operation of the battery-only system over the drive cycle, and curve 906 illustrates the cumulative heat generated by operation of the battery and capacitor system over the drive cycle. As shown, the heat generated during the drive cycle is reduced by 40-50% when using the battery and capacitor system.

The controller referenced in connection with FIGS. 6 and 8 may be any controller described herein in connection with the other figures. While FIGS. 6 and 8 reference one controller performing the steps described therein, the controller may be part of a larger control system and may be controlled by various other controllers throughout the vehicle, such as a vehicle system controller (VSC), or the controller may be VSC itself. It should therefore be understood that the controller and one or more other controllers can collectively be referred to as a "controller" that controls various actuators in response to signals from various sensors to control functions the vehicle or vehicle subsystems. The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle or vehicle sub systems.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid thermal management system comprising:
a battery;
a capacitor; and
a controller programmed to, responsive to a demand and a temperature being less than an upper threshold, select and operate only one of the battery and capacitor to satisfy the demand according to which of two values, corresponding to traction power dependent heat generation functions representing rates at which the battery and capacitor generate heat, is less to maintain the temperature below the threshold.

2. The system of claim 1, wherein the values are based on the demand, and the traction power dependent heat generation functions are based on states of the battery and capacitor.

3. The system of claim 1, wherein the temperature is a temperature of the battery, and the upper threshold is an upper threshold of a desired operating temperature range of the battery.

4. The system of claim 1, wherein the demand is a traction power demand delivered to a traction motor.

5. The system of claim 1, wherein the controller is further programmed to, responsive to the demand and the temperature being less than the upper threshold, select and operate only one of the battery and capacitor when a state-of-charge of the selected battery or capacitor is within a desired state-of-charge operating range.

6. The system of claim 1, wherein the controller is further programmed to, responsive to a state-of-charge of the capacitor being less than a first calibratable threshold and a state-of-charge of the battery being greater than a second calibratable threshold, command the battery to charge the capacitor.

7. The system of claim 1, wherein the controller is programmed to select the battery when the demand falls within first and second predefined power thresholds, and wherein the controller is programmed to select the capacitor when the demand is less than the first predefined power threshold or greater than the second predefined power threshold, the first and second predefined power thresholds being defined by the traction power dependent heat generation functions.

8. The system of claim 7, wherein the first and second predefined thresholds correspond to values of traction power at which the heat generation rates of the battery and capacitor are equal.

9. The system of claim 7, wherein the first predefined threshold is zero.

10. The system of claim 7, wherein a battery curve corresponding to the function associated with the battery has a parabolic shape with a vertex corresponding to a traction power and heat generation of zero.

11. The system of claim 10, wherein a capacitor curve corresponding to the function associated with the capacitor is asymmetric and extends through the battery curve at traction powers equal to the first and second predefined thresholds.

12. A hybrid thermal management system comprising:
a controller programmed to,
responsive to a state of a battery exceeding a threshold, assign power required from the battery and a capacitor to satisfy a demand of the system based on heat generation functions representing rates at which the battery and capacitor generate heat such that the assigned powers are minimized to minimize heat generation of the capacitor and battery, and responsive to the state being less than the threshold, assign the power such that the assigned powers are maximized to maximize heat generation of the capacitor and battery.

13. The system of claim 12, wherein the state is a temperature of the battery, and the threshold is a lower threshold of a desired operating temperature range of the battery.

14. The system of claim 12, wherein the assigned power is based on the demand, and the heat generation functions are based on respective temperatures and states-of-charge of the battery and capacitor.

15. The system of claim 12, wherein assigning power includes selecting one of the battery and capacitor to be an optimal operating component, and wherein the controller is further programmed to, responsive to a state-of-charge of the optimal operating component being outside a desired state-of-charge operating range, decrease the assigned power of the optimal operating component by a reduction factor and increase the assigned power of the other of the battery and capacitor accordingly to meet the demand.

16. The system of claim 15, wherein selecting one of the battery and capacitor to be the optimal operating component includes selecting the battery when the demand falls within first and second predefined power thresholds and selecting the capacitor when the demand is less than the first predefined threshold or greater than the second predefined threshold, and wherein the first and second predefined thresholds are defined by the heat generation functions.

17. The system of claim 12, wherein the controller is further programmed to, responsive to a state-of-charge of the capacitor being less than a first calibratable threshold and a state-of-charge of the battery being greater than a second calibratable threshold, command the battery to charge the capacitor.

18. The system of claim 12, wherein the heat generation functions are based on the demand.

19. A hybrid thermal management system comprising:
a battery;
a capacitor; and
a controller programmed to assign power required from each of the battery and the capacitor to satisfy a demand of the system, the assigned power being based on a state of at least one of the battery and the capacitor and heat generation functions representing rates at which the battery and the capacitor generate heat such that for a given value of the demand, the assigned power maximizes heat generated by the battery and capacitor when the state is less than a lower threshold and minimizes the heat generated when the state is greater than an upper threshold.

20. The system of claim 19, wherein assigning power includes selecting one of the battery and capacitor to be an optimal operating component, and wherein the controller is further programmed to, responsive to a state-of-charge of the optimal operating component being outside a desired state-of-charge operating range, decrease the assigned power of the optimal operating component by a reduction factor and increase the assigned power of the other of the battery and capacitor accordingly to meet the demand.

* * * * *